(12) United States Patent
Lawrence

(10) Patent No.: US 8,387,438 B2
(45) Date of Patent: Mar. 5, 2013

(54) FLOW MEASUREMENT DEVICES HAVING CONSTANT RELATIVE GEOMETRIES

(75) Inventor: Philip A. Lawrence, Kingwood, TX (US)

(73) Assignee: Cameron International Corporation, Houston, TX (US)

( * ) Notice: Subject to any disclaimer, the term of this patent is extended or adjusted under 35 U.S.C. 154(b) by 77 days.

(21) Appl. No.: 13/007,560

(22) Filed: Jan. 14, 2011

(65) Prior Publication Data

US 2012/0180547 A1 Jul. 19, 2012

(51) Int. Cl.
*G01P 21/00* (2006.01)
(52) U.S. Cl. .......................................... 73/1.35
(58) Field of Classification Search .................. None
See application file for complete search history.

(56) References Cited

U.S. PATENT DOCUMENTS

| | | | |
|---|---|---|---|
| 4,290,314 A * | 9/1981 | Geronime | 73/861.52 |
| 4,638,672 A | 1/1987 | McCall | |
| 4,812,049 A | 3/1989 | McCall | |
| 5,363,699 A | 11/1994 | McCall | |
| 5,814,738 A | 9/1998 | Pinkerton et al. | |
| 5,970,801 A | 10/1999 | Ciobanu et al. | |
| 6,324,917 B1 | 12/2001 | Mack et al. | |
| 6,474,177 B2 | 11/2002 | Maeda et al. | |
| 6,651,514 B2 | 11/2003 | Zanker | |
| 6,843,183 B2 | 1/2005 | Strong | |
| 6,865,957 B1 | 3/2005 | Hughes et al. | |
| 7,047,822 B2 | 5/2006 | Good et al. | |
| 7,500,405 B2 * | 3/2009 | Gongaware et al. | 73/861.52 |
| 7,832,283 B2 * | 11/2010 | Peters et al. | 73/861.52 |
| 2004/0237664 A1 | 12/2004 | Sergeral | |
| 2006/0053902 A1 * | 3/2006 | Good et al. | 73/861.52 |
| 2011/0185805 A1 * | 8/2011 | Roux et al. | 73/152.29 |

FOREIGN PATENT DOCUMENTS

| | | |
|---|---|---|
| EP | 1286140 A1 | 2/2003 |
| GB | 430970 | 6/1935 |
| GB | 2411476 | 8/2005 |
| KR | 2010007448 | 10/2010 |
| WO | WO88/01369 | 2/1988 |
| WO | WO2006/022702 | 3/2006 |

OTHER PUBLICATIONS

U.S. Appl. No. 13/001,030, filed Dec. 22, 2010, Philip A. Lawrence.
International Search Report and Written Opinion for PCT No. PCT/US2012/021142 dated Jun. 29, 2012; 12 pgs.

* cited by examiner

*Primary Examiner* — Robert R Raevis
(74) *Attorney, Agent, or Firm* — Fletcher Yoder, P.C.

(57) ABSTRACT

Systems and methods are disclosed for differential pressure meters having a constant beta edge boundary defined by fluid displacement members of the meter. In some embodiments, a differential pressure meter may have an interchangeable fluid displacement member, such that each fluid displacement member replaced in the meter maintains a constant beta edge boundary. In other embodiments, a family of differential pressure meters having permanent fluid displacement members may maintain a constant beta edge boundary for each meter of the family of differential pressure meters.

22 Claims, 11 Drawing Sheets

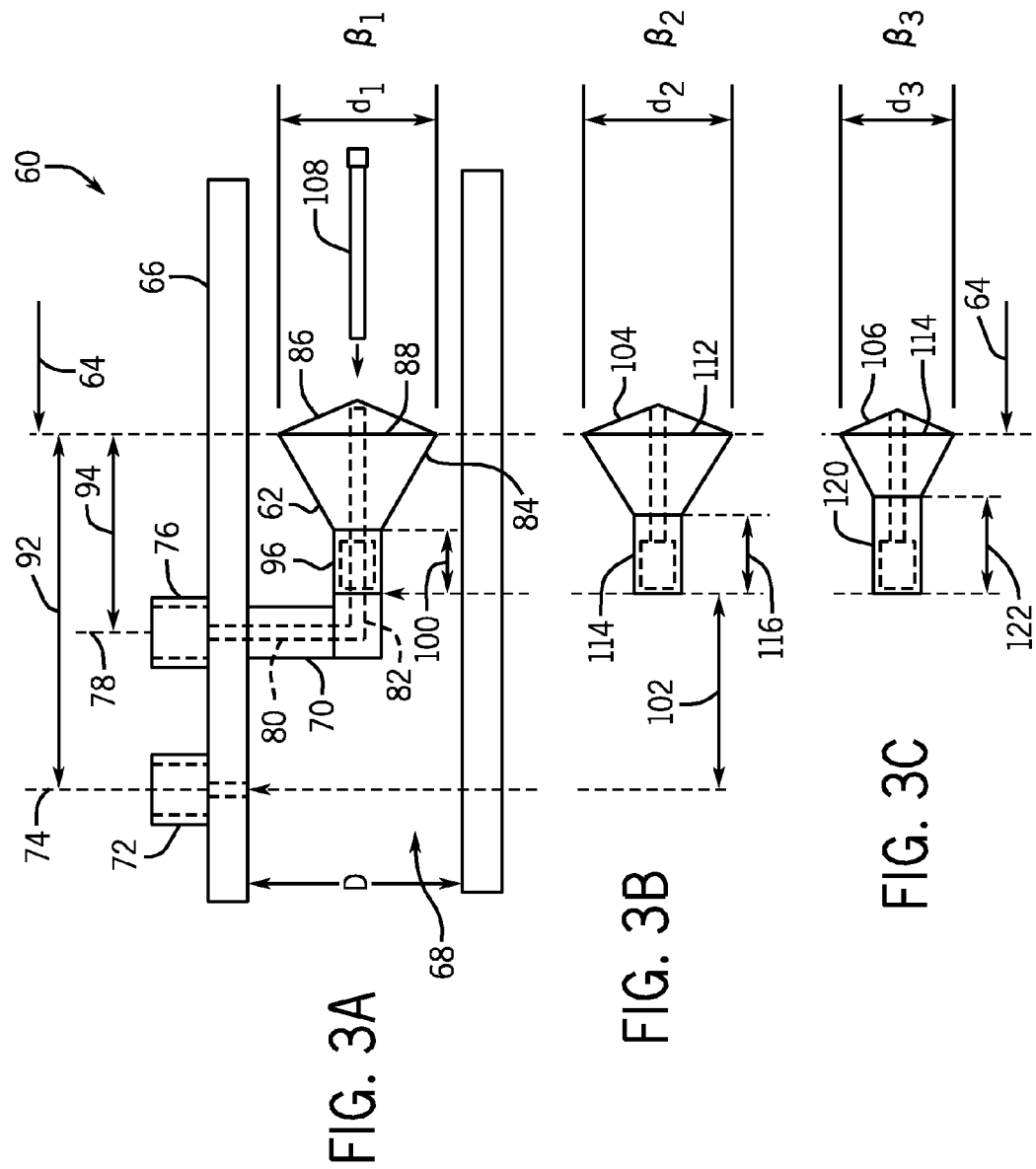

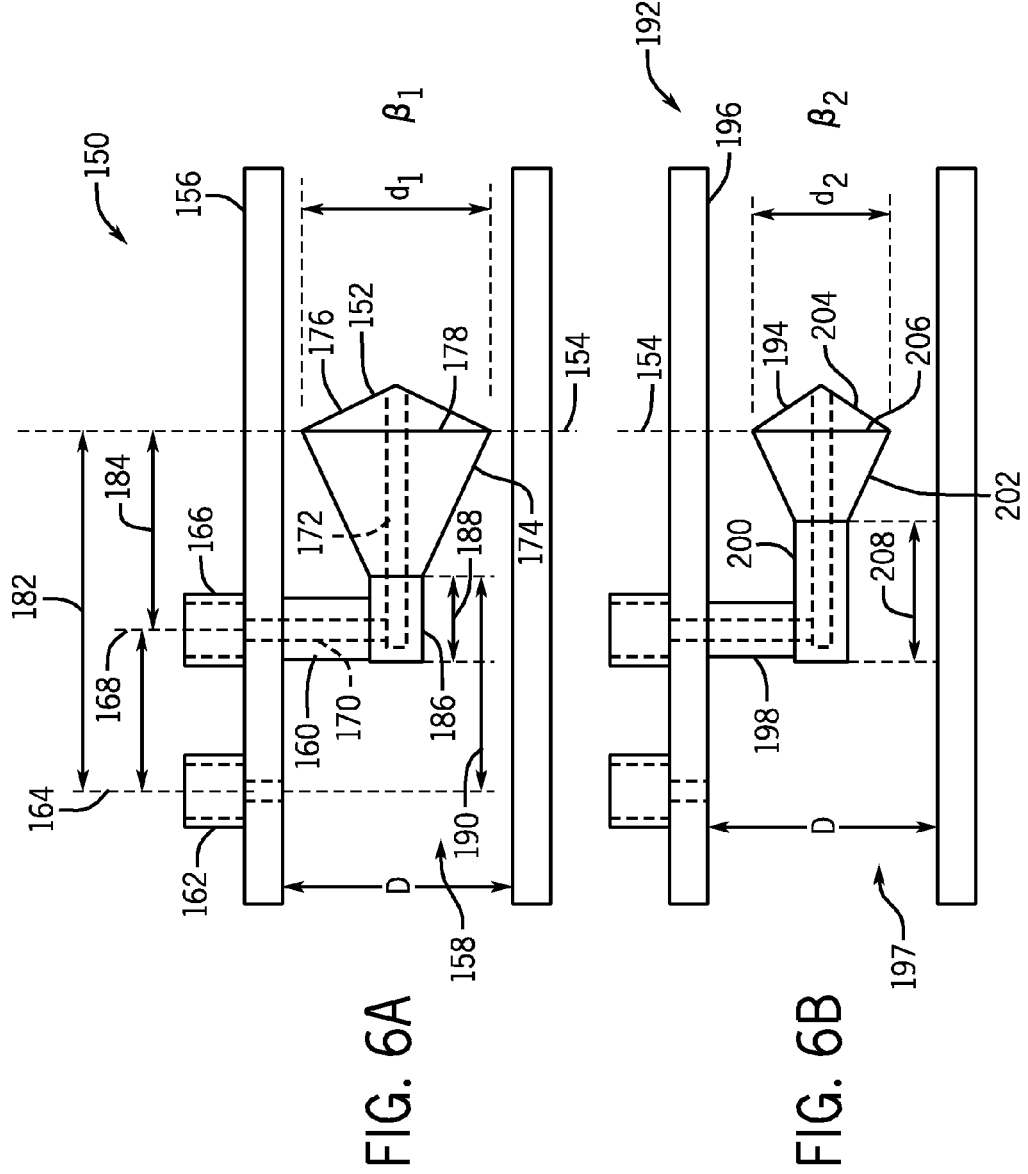

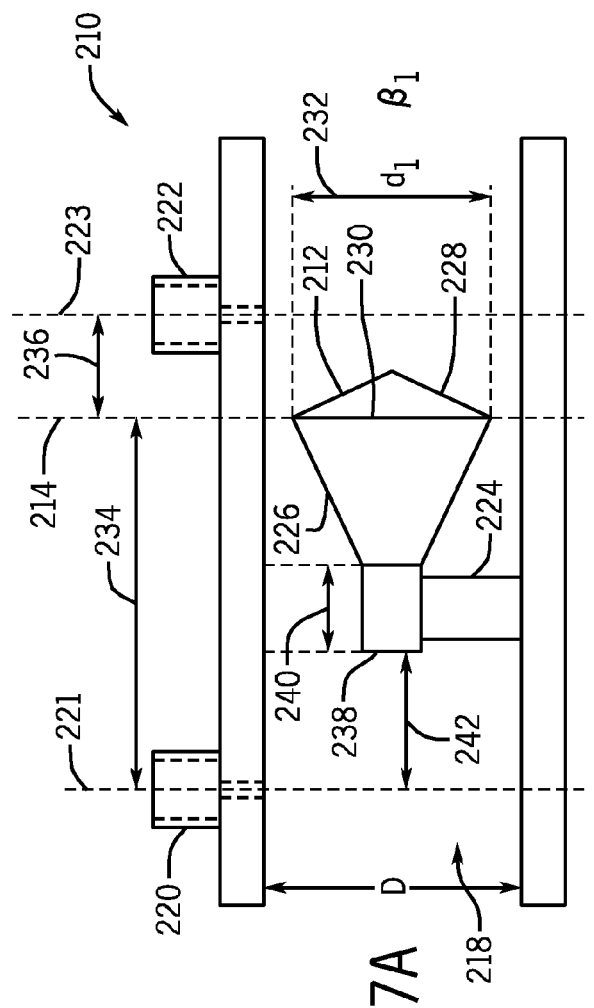
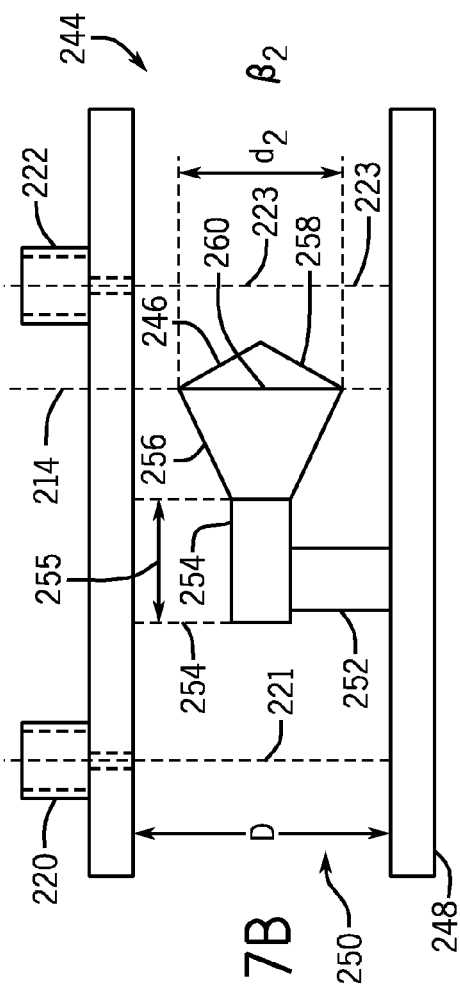
FIG. 7A
FIG. 7B

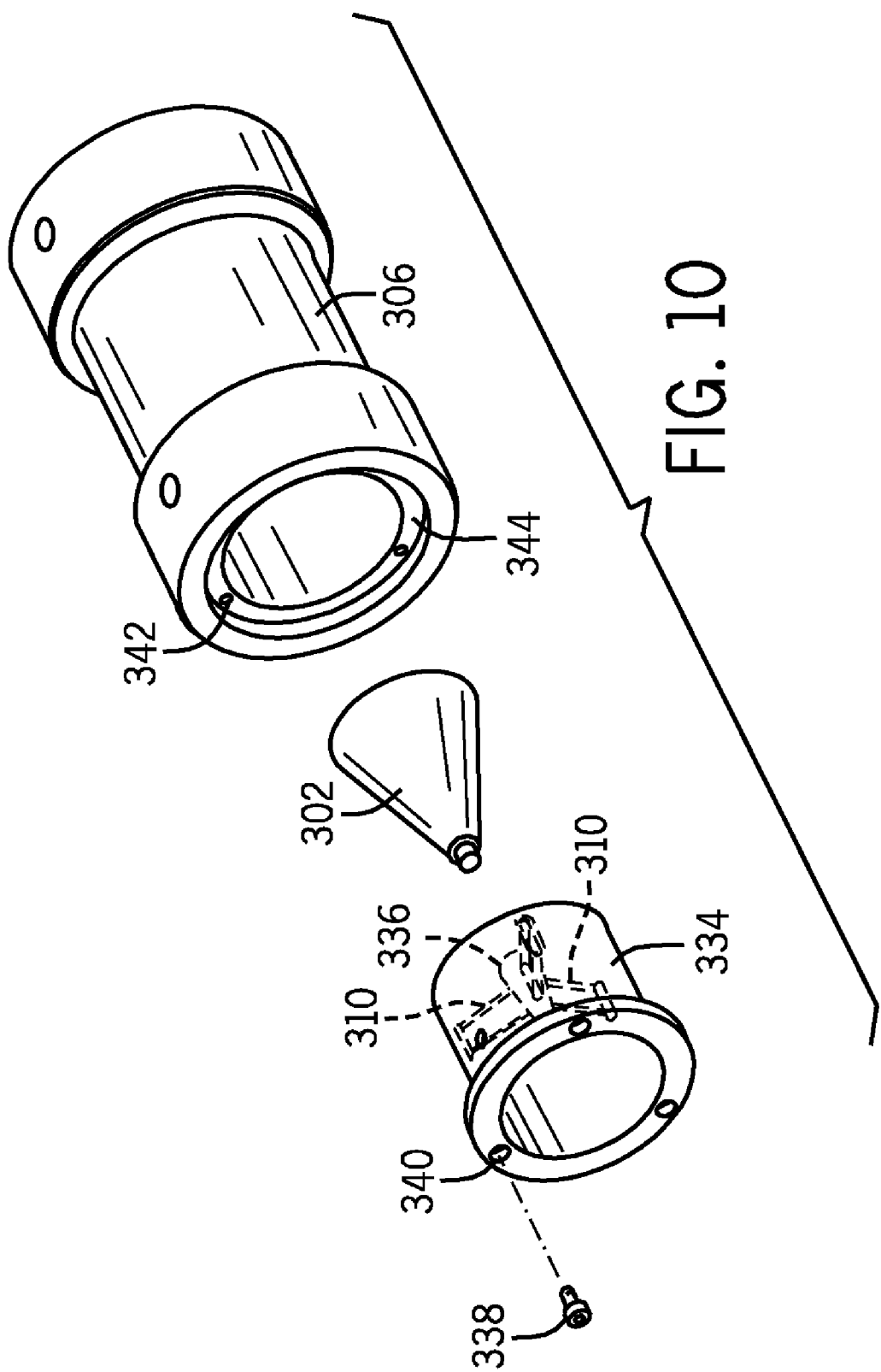

FLOW MEASUREMENT DEVICES HAVING CONSTANT RELATIVE GEOMETRIES

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Transport of fluids, such as in oil and gas systems, power generation systems, etc., relies on a variety of components and devices. For example, fluids may be transported through a complex network of pipes, fittings, and processing equipment. Such networks may be a part of pipelines or other transportation structures to transport the fluid from a source to a destination, such as further transportation systems or storage facilities. Such pipelines or other transportation structures may include pressure control, regulation, and safety devices, which may include valves, actuators, sensors, and electronic circuitry.

It may be desirable to measure the flow rate of the fluid in such systems. One particular type of flow rate measurement device may be referred to as a differential pressure meter. A differential pressure meter places a fluid displacement member centrally within the flow path of a fluid. As the fluid flows around the displacement member, the fluid displacement member causes differential pressure in the fluid. The difference in pressure may be measured via taps disposed on the upstream and downstream portions of the fluid displacement member. The flow rate of the fluid may be determined from the difference in pressure.

The differential pressure meters are designed for use with and calibrated for specific types of fluids and flow rate ranges. During operation, the actual flow rate of a fluid may be outside the range measured by the meter, and, the type or composition of the fluid may also change.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIGS. 3A-3C are partial cross-sections of a differential flow meter having an interchangeable fluid displacement member that maintains a constant beta edge boundary in accordance with an embodiment of the present invention;

FIGS. 6A-6B are partial cross-sections of a family of differential pressure meters having different fluid displacement members that maintain a constant beta edge boundary in accordance with an embodiment of the present invention;

FIGS. 7A-7B are partial cross-sections of a family of differential pressure meters having different fluid displacement members that maintain a constant beta edge boundary in accordance with another embodiment of the present invention;

FIG. 10 is an exploded perspective view of the flangeless differential pressure meter and interchangeable fluid displacement member of FIG. 9A in accordance with an embodiment of the present invention.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention include maintaining a constant beta edge boundary for a fluid displacement member of one or more differential pressure flow meters. In one embodiment, a differential pressure meter may include an interchangeable fluid displacement member that maintains a constant distance between the beta edge boundary and the center lines of the taps in the meter. In other embodiments, a family of differential pressure meters may include different beta ratio fluid displacement members that maintain a constant distance between the beta edge boundary and the center lines of the taps of each meter.

Figure 1:
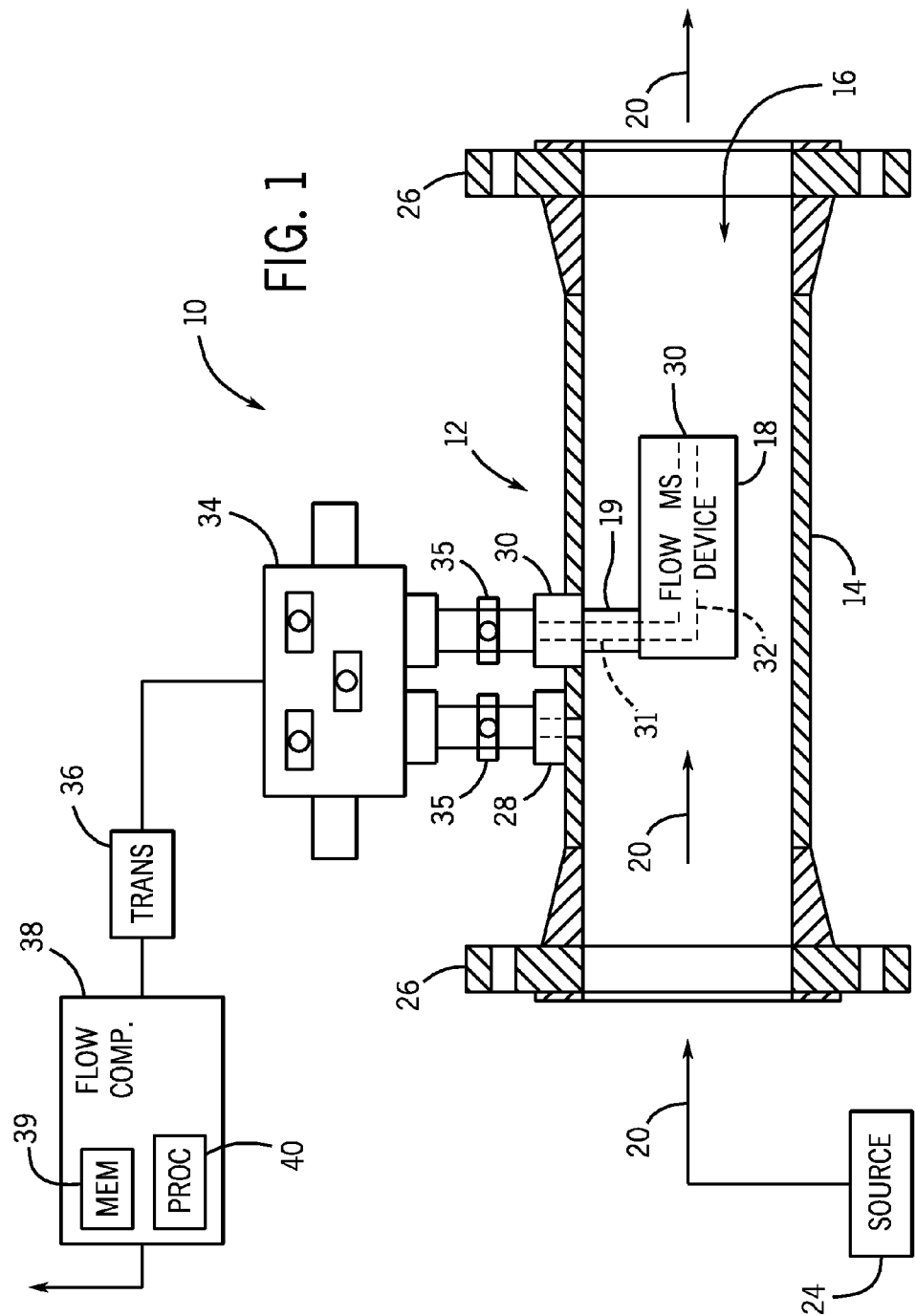
FIG. 1 is a diagram of a differential pressure flow meter in accordance with an embodiment of the present invention.

FIG. 1 depicts a system 10 having a flow measurement device, e.g., a differential pressure flow meter 12, in accordance with an embodiment of the present invention. The differential pressure meter 12 includes a meter body 14 having a conduit 16 through which fluid may flow. A fluid displacement member 18 may be centrally disposed in the conduit 16 and suspended from the conduit 16 via a support 19. Fluid may flow through the conduit 16 and over the fluid displacement member 18 in the direction indicated by arrows 20. The fluid may flow into the conduit 16 of the meter 12 either directly or indirectly from a source 24. For example, the source 22 may be a source of oil, natural gas (such as coal bed methane), steam, or any other suitable fluid. The meter body 14 may include flanges 26 to provide for installation in a pipeline (e.g., between pipe sections) or other transportation structure. The flanges 26 may be secured to other structure via bolts, welds or any other suitable techniques.

As the fluid flows through the conduit 16, the fluid displacement caused by the fluid displacement member 18 may introduce a difference in pressure between the upstream fluid (e.g., upstream of the member 18) and the downstream member (e.g., downstream of the member 18). In some embodiments, the fluid displacement member 18 may have one or more frustum portions, conical portions, or any other shaped portions suitable for creating a pressure differential in the fluid. In yet other embodiments, multiple fluid displacement members may be included in the meter body 14 of the flow measurement device 12. In some embodiments, the fluid displacement member 18 may be removably attached by and to the support 19 such that the member 18 may be removed and/or replaced. In other embodiments, the member 18 may be permanently secured by the support 19, such as by welding.

The meter body 14 may include an upstream pressure tap 28 in fluid communication with the conduit 16 and a downstream pressure tap 30 in fluid communication with the interior of the fluid displacement member 18 and the downstream portion of the conduit 16, such as via hollow region 32 (e.g., interior passage) of the support 19 and hollow region 31 (e.g., interior passage) of the fluid displacement member 18. The difference in pressure measured at the upstream tap 28 and the downstream tap 30 may be used to determine the flow rate of the fluid flowing through the conduit 16.

The upstream tap 28 and downstream tap 30 may be coupled to a valve manifold 34. Valves 35 may be coupled between the manifold 34 and the taps 28 and 30. The manifold 34 may be coupled to a transmitter 36 that records the differential pressure signal generated by the meter 12 and provides an output (e.g., an analog or serial output) to a computer 38, such as a flow computer or data control system having memory 39 and processor 40. The manifold 34 isolates the transmitter 36 from the process fluid and may enable maintenance and calibration of the transmitter 36. It should be appreciated that the system 10 may include any other devices suitable for controlling and/or monitoring the fluid flowing through the conduit 16, such as a resistance temperature detector (RTD).

Figure 2:
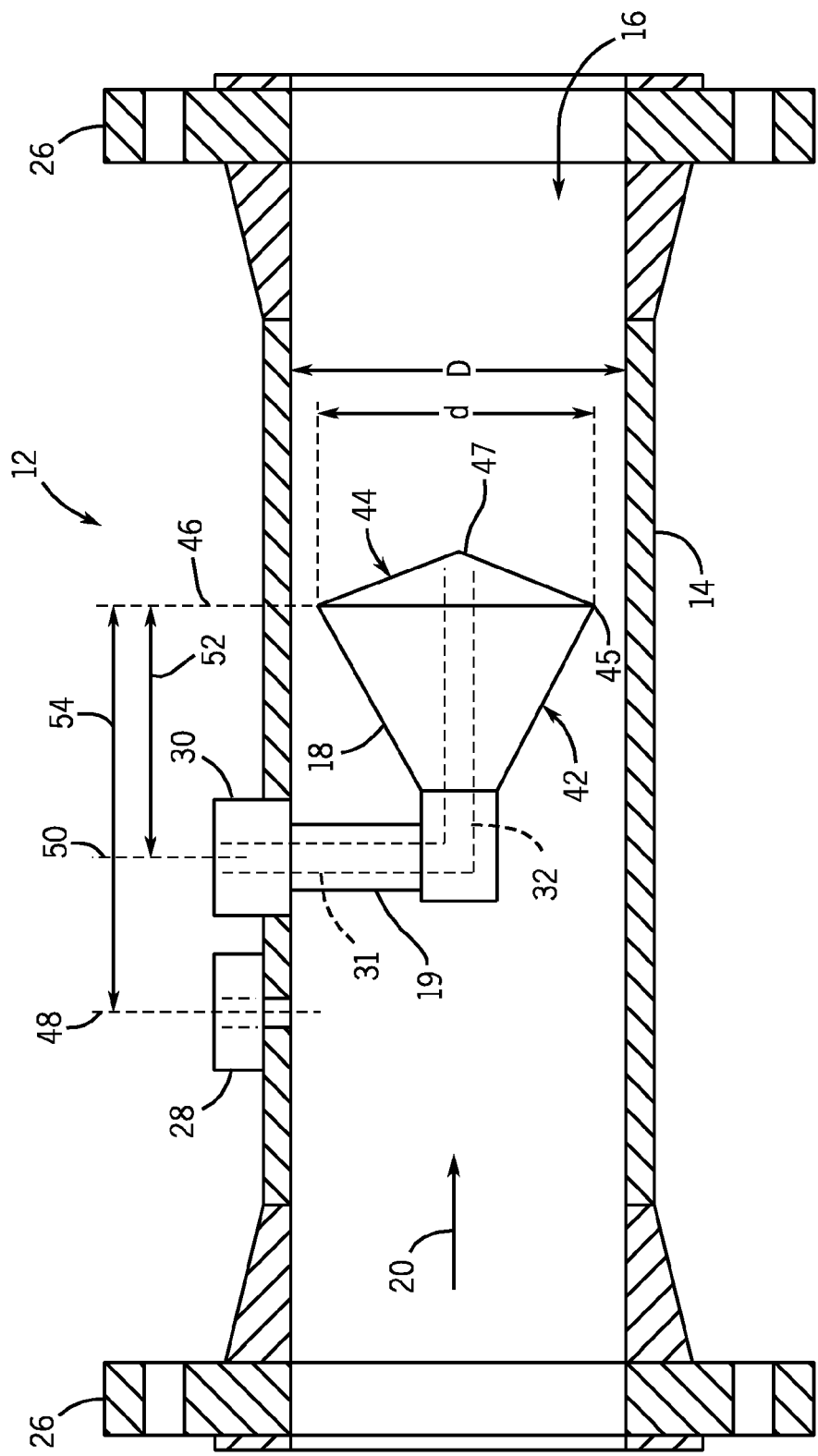
FIG. 2 is a partial cross-section of the meter of FIG. 1 in accordance with an embodiment of the present invention.

FIG. 2 depicts a cross-section of the meter 12 illustrating the fluid displacement member 18 having an upstream frustum 42 and a downstream frustum 44 in accordance with an embodiment of the present invention. As illustrated, the upstream frustum 42 comprises a diverging cone relative to the fluid flow direction 20, whereas the downstream frustum 44 comprises a converging cone relative to the fluid flow direction 20. The interface between the upstream frustum 42 and downstream frustum 44 forms a peripheral edge 45 (also referred to as cantilevered edge). The peripheral edge 45 forms a beta-edge boundary (also referred to as a "BEB") 46 of the meter 12.

As shown in FIG. 2, the downstream frustum 44 may include a hole 47 connected to hollow region 32 to enable fluid communication between the downstream tap 30 and the fluid downstream from the member 18. The shape of the member 18 may be designed to reshape the fluid velocity provide upstream of the member 18, creating a pressure drop between the downstream and upstream portions of the fluid in the conduit 16.

The calibration and accuracy of the meter 12 depends in part on the "beta ratio" (also referred to as area ratio). The beta ratio refers to the ratio between the diameter ("d") of the peripheral edge 45 and the diameter ("D") of the conduit 16. Additionally, the slope of the downstream frustum 44 may be referred to as a "beta angle." The beta ratio may be determined as follows:

$$\beta = \frac{\sqrt{D^2 - d^2}}{D} \tag{1}$$

Where:
β=the beta ratio;
D=the diameter of the conduit 16; and
d=the diameter of the downstream frustum at the peripheral edge, i.e., at the beta edge boundary.

Thus, for a given beta ratio, the diameter d of the peripheral edge 45 may be determined as follows:

After determination of the Beta ratio, the mass flow rate of the fluid may be determined as follows:

$$qm = N_1 C d E v Y (\beta D)^2 \sqrt{\rho_{t,p} \Delta P} \tag{2}$$

Where:
qm is the mass flow rate;
$N_1$ is a units constant;
Cd is a discharge coefficient that may determined during calibration of the meter;
$\rho_{t,p}$ is the fluid density at flowing conditions;
ΔP is the differential pressure (that may be determined from data received the upstream tap 28 and downstream tap 30;

For Equation 2, Y may have a value of 1 for incompressible fluids. For compressible fluids, Y may be experimentally determined or calculated by various techniques, such as according to the following equation:

$$Y = 1 - (0.41 + 0.35\beta^4)\frac{\Delta P}{k} \tag{3}$$

Where:
k is the gas isentropic exponent.

For Equation 2, Ev may be determined from the beta ratio (β) as follows:

$$Ev = \frac{1}{\sqrt{1-\beta^4}} \tag{4}$$

After determination of the mass flow rate, volumetric rates of the fluid may be determined. For example, the volumetric flow rate at flowing conditions (also referred to as "gross" or "actual" flow rates) may be determined as follows:

$$qv = \frac{qm}{\rho_{t,p}} \tag{5}$$

Where:
qv is the volumetric flow rate at flowing conditions.

Similarly, the volumetric flow rate at based conditions (also referred to as "standard" flow rates) may be determined as follows:

$$Qv = \frac{qm}{\rho_b} \tag{6}$$

Where:
Qv is the volumetric flow rate at base conditions; and
$\rho_b$ is the fluid density at base conditions.

It should be appreciated that changes in temperature, Reynolds number of the fluid, or any other parameter may be compensated for in the above equations by using suitable correction techniques.

As described above, the beta ratio determined in Equation 1, and used in the determination of mass flow rate in Equation 2, may be a function of the position of the beta edge boundary 46. Additionally, the calibration information for the meter, such as the coefficient of discharge (C.d.) in Equation 2, may be a function of the position of the beta edge boundary 46. The position of the beta edge boundary 46 may be defined relative to the center line 48 of the upstream tap 28 and the center line 50 of the downstream tap 30. Thus, the meter 12 may define a distance 52 between the beta edge boundary 46 and the center line 50 and a distance 54 between the beta edge boundary 46 and the center line 48 of the upstream tap 28.

The fluid flowing from the source 24, such as a well, may be produced under gradually less pressure as the amount of fluid in the well decreases. In such an embodiment, the originally designed and calibrated beta ratio of the meter 12 may have a measurable range unsuitable for the lower flow rate of the fluid. Additionally, the meter 12 may be moved and used in a new system having a different fluid flow rate or a different type of fluid. Typically, the beta ratio of the meter 12 may be changed by shortening the length of the member 18, thus changing the diameter d of the peripheral edge 45. However, such changes in the beta ratio also result in changing the coefficient of discharge (C.d.) for the meter 12, thus changing the calibration parameters of the meter 12. As a consequence, by changing the member 18 in this manner, such conventional meters also change the beta edge boundary, reducing or lengthening the beta edge boundary relative to other components of the meter 12.

FIGS. 3A-3C depict a differential pressure meter 60 having a removable fluid displacement member 62 that maintains a constant position of a beta edge boundary 64 in accordance with an embodiment of the present invention. The differential pressure meter 60 includes a meter body 66 having a conduit 68 through which fluid may flow. The fluid displacement member 62 may be centrally disposed in the conduit 68 and suspended from the conduit 68 via a support 70. The meter body 66 may include an upstream pressure tap 72 having a center line 74 and in fluid communication with the conduit 68 and a downstream pressure tap 76 having a center line 78 in fluid communication with the interior of the fluid displacement member 62 and the downstream portion of the conduit 68, such as via hollow region 80 (e.g., interior passage) of the support 70 and hollow region 82 (e.g., interior passage) of the fluid displacement member 62.

The fluid displacement member 62 includes an upstream frustum 84 and a downstream frustum 86. As illustrated, the upstream frustum 84 comprises a diverging cone relative to the fluid flow direction, whereas the downstream frustum 86 comprises a converging cone relative to the fluid flow direction. As described above, the interface between the upstream frustum 84 and downstream frustum 86 forms a peripheral edge 88 that defines the beta edge boundary 64. The fluid displacement member 62 may define a beta ratio $\beta_1$ based on the diameter $d_1$ of the peripheral edge 88 and the diameter D of the conduit 68.

The beta edge boundary 64 may be defined relative to the center line 74 by a distance 92 and relative to the center line 78 by a distance 94. Additionally, the fluid displacement member 62 may be coupled to the support 80 by a barrel 96 having a length 100 and defined relative to the center line 74 by a distance 102.

The fluid displacement member 62 may be interchangeable and may be detached and replaced with an additional fluid displacement member 104, as shown in FIG. 3B, and an additional fluid displacement member 106, as shown in FIG. 3C. The fluid displacement member 62 may be coupled to the support 70 though any suitable attachment mechanism. For example, the straight barrel 96 may include threads that couple to corresponding threads on the support 70, as described below in FIG. 5. The fluid displacement member 62 may be secured by a central locking bolt 108 inserted through the fluid displacement member 62.

As shown in FIG. 3B, the additional fluid displacement member 104 may provide a different beta ratio $\beta_2$, such as through a larger or smaller diameter $d_2$ of a peripheral edge 112 of the member 104. The fluid displacement member 104 may include a barrel section 114 having a length 116. Similarly, as shown in FIG. 3C, the additional fluid displacement member 106 may provide a different beta ratio $\beta_3$, such as through a smaller diameter peripheral edge 119 of the member 106. The fluid displacement member 106 may include a barrel section 120 having a length 122

As shown in FIGS. 3B and 3C, the additional fluid displacement members 104 and 106 maintain a constant position of the beta edge boundary 64 relative to the center line 74 and the center line 76. For example, as shown in FIG. 3B, the length 116 of the barrel section 114 may be greater than the length 100 of the barrel section 96 to maintain the position of the beta edge boundary 64. In another example, as shown in FIG. 3C, the length 122 of the barrel section 120 of the fluid displacement member 106 may be greater than the length 100 to maintain the position as the beta edge boundary 64. In other embodiments, the length of a barrel section of a fluid displacement may be less than the length 100 to maintain the position of the beta edge boundary 64.

Advantageously, the meter 60 depicted in FIGS. 3A, 3B, and 3C may maintain a similar C.d. regardless of the use of fluid displacement members 62, 104, and 106. Thus, because the position of the beta edge boundary 64 is maintained for each fluid displacement member, the meter 60 may only require a single calibration and use of the same calibration information, e.g., C.d., regardless of the beta ratio $\beta_1$, $\beta_2$, or $\beta_3$. The elimination of additional calibration may increase the accuracy of the meter 60 across changes in fluid displacement members and beta ratios, while increasing ease of use and reducing maintenance.

Figure 4A:
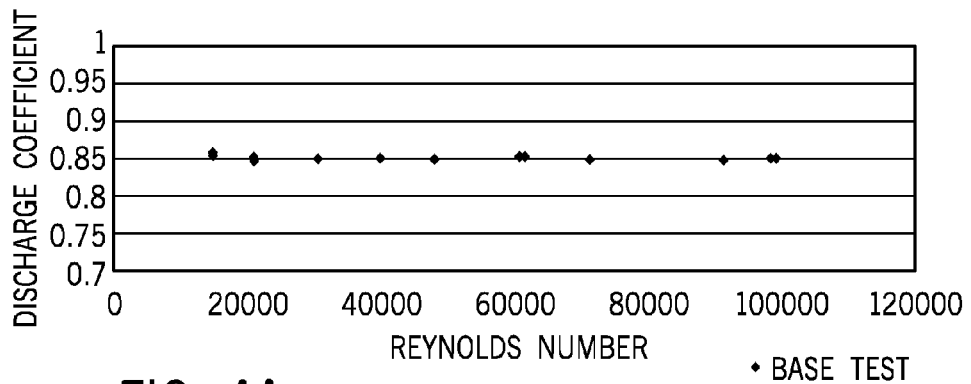
FIGS. 4A-4C are graphs plotting the C.d. for differential pressure meters each having a different beta ratio and maintaining a constant beta edge boundary in accordance with an embodiment of the present invention.
Figure 4B:
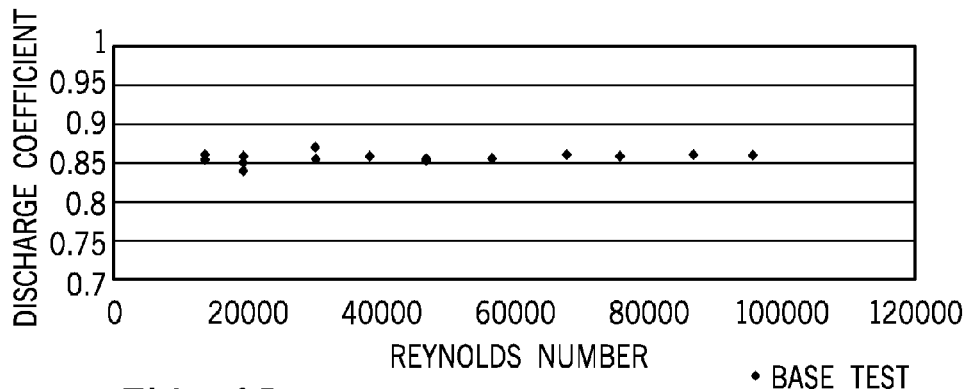
Figure 4C:
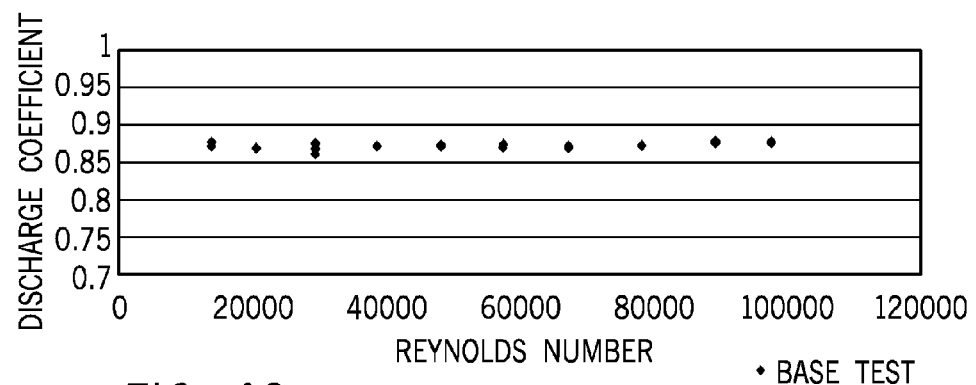

FIGS. 4A-4C are graphs each depicting the C.d. for different differential pressure meters each having a different beta ratio but utilizing the constant beta edge boundary technique described above. The x-axis in each of FIGS. 4A-4C depicts the Reynolds number of water flowing through one inch differential pressure meters and the y-axis in each of FIGS. 4A-4C depicts the C.d. of the meter.

FIG. 4A depicts a first differential pressure meter having a beta ratio of 0.45. As shown in FIG. 4A, the C.d. of the meter is about 0.85 throughout the illustrated range of Reynolds numbers. FIG. 4B depicts a second differential pressure meter having a beta ratio of 0.65 and maintaining the beta edge boundary in the same position as the meter shown in FIG. 4A. As shown in FIG. 4B, the C.d. of the meter is about 0.85 throughout the illustrated range of Reynolds numbers, about the same C.d. as the meter shown in FIG. 4A. Finally, FIG. 4C depicts a third differential pressure meter having a beta ratio of 0.75 and maintaining the beta edge boundary in the same position as the meter shown in FIGS. 4A and 4B. As shown in FIG. 4C, the C.d. of the meter is about 0.87 throughout the illustrated range of Reynolds numbers, about the same C.d. as the meter shown in FIGS. 4A and 4B.

Figure 5:
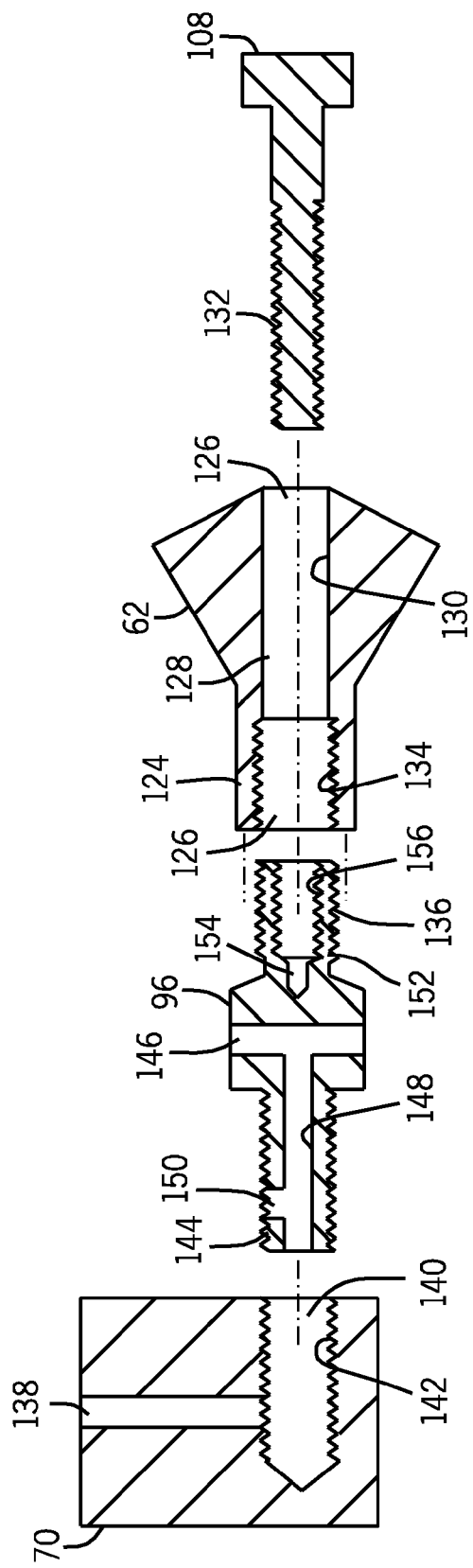
FIG. 5 is an exploded view of a detachable fluid displacement member in accordance with an embodiment of the present invention.

FIG. 5 is an exploded cross-sectional view of the fluid displacement member 62 in accordance with an embodiment of the present invention. As shown in FIG. 5, the fluid displacement member 62 further includes an extension 124, such as a cylinder adjacent to, or formed as an integral part of, the upstream frustum 84. In one embodiment, particularly applicable when further stability is required (e.g., vibrating pipes and the like), the fluid displacement member 62 also includes a contiguous bore 126 from the extension 124 to an attachment bore 128, which is hollowed out of the fluid displacement member 62. The bore 126 has internal threading 130 for screw threaded mating engagement with external threading 132 on the bolt 108. The attachment bore 128 has internal threading 134 for screw threaded mating engagement with external threading 136 on the barrel 96.

As also shown in FIG. 5, the support 70 includes a vertical bore 138 in fluid communication with the pressure tap 76 and the attachment bore 140, oriented along the axial direction of the conduit 68, with internal threading 142 for screw threaded mating engagement with external threading 144 on the barrel 96. The barrel 96 has external threading 144 on one end, external threading 136 on another end, and at least one of bores 146 drilled through the middle section of the barrel 96 such that it is in fluid communication with adjacent fluid flow. The barrel 96 also includes a longitudinal bore 148, which extends from the bores 146 to the end of the component 96, and a hole 150, which is drilled through external threading 144. The support 70 further mounts normally to the wall 32 of the conduit 68 by any means known in the art such that the vertical bore 138 aligns with the tap 76.

When assembled, external threading 144 of the barrel 96 is mated with internal threading 142 of the attachment bore 140 of the support 70 such that the barrel 96 is inserted into and matingly engaged with the attachment bore 140 of the support 70. Upon such engagement, the hole 150 should be aligned with the vertical bore 138 such that fluid communication is maintained between the tap 76, the vertical bore 138, the longitudinal bore 148, and at least one of the bores 146. Further, the fluid displacement member 62 is assembled with the bolt 108, the attachment bore 128 and the bore 126 as described above. External threading 136 of the barrel 96 then is mated with internal threading 134 on the attachment bore 128 such that the barrel 96 is inserted into and engaged with the attachment bore 128 and the fluid displacement member 62.

As described above and shown in FIG. 5, the barrel 96 comprises at least one bore 146 drilled through the barrel 96 such that the interior of the barrel 96 is in fluid communication with fluid flow adjacent to the fluid displacement member 62. Preferably, a number of the bores 146 may be provided through the barrel 96 so as to allow the tap 76 to sense the fluid pressure at in order to allow for the measurement of fluid flow.

Referring still to FIG. 5, the barrel 96 further includes an end portion 152. In use, the end portion 152 may be matingly inserted into attachment bore 128 to mount fluid displacement member 62 to support the barrel 96 such that fluid displacement member 62 resides coaxially within conduit 68. In this manner, fluid displacement member 62 is readily attachable to and detachable from support 70 and interchangeable with other fluid displacement members of different sizes and/or different configurations to accommodate measurement of fluid flow within the conduit 62 of different fluids and different flow rates and to facilitate use in the conduit 62 of fluid displacement members having different beta ratios, as described above in FIGS. 3B and 3C. As also described above, the bolt 108 with external threading 132 for screw threaded mating engagement with internal threading 130 may be matingly inserted into the fluid displacement member 62 and bore 126 by threading into the fluid displacement member 62 and bore 126, such that the bolt 108 extends through the fluid displacement member 62, whereupon the bolt 108 exits through attachment bore 128, and matingly inserts into a receiving slot 154 having internal threads 156.

External threading 136 on the end portion 152 and external threading 132 on bolt 108 should cause rotation in opposite directions as the fluid displacement member 62 and the bolt 108, respectively, are installed. Thus, if either the member 62 or the bolt 108 rotates, the other tends to resist such rotation providing for a more stable connection. Threading on either the end portion 152 or the bolt 108 can also be of a different type. For example, external threading 136 may be with coarse threads while external threading 132 may be with fine threads. To further secure the threads, a thread locking compound, such as Loctite®, could be applied to all threading. Moreover, as is well-known in the art, a screwdriver slot may be provided for tightening the fluid displacement member 62 and a hex socket may be provided for tightening the bolt 108.

The detachable mounting of fluid displacement member 62 to support 70 is advantageous in terms of manufacture of fluid measurement systems. Standardized manufacturing procedures may be utilized to produce conduit sections of various standard diameters and fluid displacement members of various standard diameters, configurations and beta ratios such that fluid measurement systems meeting individual specifications can be quickly and economically assembled from standard, in-stock, commercially available components rather than being made to order. As described above, additional fluid displacement members 62 may be attached by barrels 96 having different lengths to maintain the position of the beta edge ratio 64 with respect to the taps 72 and 76, e.g., to keep constant distances 94 and 92.

In other embodiments, the beta edge boundary may be maintained in the same position across a family of differential pressure meters having a permanent fluid displacement member disposed in the meter body. FIGS. 6A-6C depict a differential pressure meter 150 having a permanently coupled fluid displacement member 152 having a beta edge boundary 154 in accordance with an embodiment of the present invention. The differential pressure meter 150 includes a meter body 156 having a conduit 158 through which fluid may flow. The fluid displacement member 152 may be centrally disposed in the conduit 158 and suspended from the conduit 158 via a support 160. The support 160 may be permanently coupled to the wall of the conduit 158, such as by welding, and the fluid displacement member 152 may permanently coupled to the support 160, such as by welding. In some embodiments, the fluid displacement member 152 and support 160 may be a single component. As also described above, the meter body 156 may include an upstream pressure tap 162 having a center line 164 and in fluid communication with the conduit 158 and a downstream pressure tap 166 having a center line 168 in fluid communication with the interior of the fluid displacement member 152 and the downstream portion of the conduit 158, such as via hollow region 170 (e.g., interior passage) of the support 160 and hollow region 172 (e.g., interior passage) of the fluid displacement member 152.

The fluid displacement member 172 may include an upstream frustum 174 and a downstream frustum 176, similar to the embodiments described above. As described above, the interface between the upstream frustum 174 and downstream frustum 176 forms a peripheral edge 178 that defines the beta edge boundary 154. The fluid displacement member 172 may define a beta ratio $\beta_1$ based on the diameter $d_1$ of the peripheral edge 178 and the diameter D of the conduit 158.

As described above, the beta edge boundary 154 may be defined relative to the center line 164 by a distance 182 and relative to the center line 168 by a distance 184. Additionally, the fluid displacement member 152 may be coupled to the support 160 by a barrel 186 having a length 188 and defined relative to the center line 164 by a distance 190.

As discussed above, by maintaining the position of the beta edge boundary 154, the additional meter shown in FIG. 6B may have a similar C.d., and thus may use the same calibration information, as the meter 150 depicted in FIG. 6A. For example, as shown in FIG. 6B, a second meter 192 may include a fluid displacement member 194 permanently coupled to a meter body 196 having a conduit 197 and having the same beta edge boundary 154. The fluid displacement member 194 of the second meter 192 may be coupled to the meter body 196 by a support 198 and a barrel 200 in a manner similar to the meter 150. Additionally, the fluid displacement member 194 may also include an upstream frustum 202 and a downstream frustum 204 defining a peripheral edge 206 of the member 194 at the beta edge boundary 154.

As shown in FIG. 6B, the meter 192 may have a different beta ratio $\beta_2$, based on the diameter D of the conduit 197 and the diameter $d_2$ of the peripheral edge 206. However, as also shown in FIG. 5B, the position of the beta edge boundary 154 is maintained relative to the center line 164 of the tap 162 and the center line 168 of the downstream tap 166. Thus, the meter 192 may have the same C.d. as the meter 150, allowing the meter 192 to use the same calibration information as the meter 150. In some embodiments, the beta edge boundary 154 may be maintained by increasing a length 208 of the barrel 200, to compensate for a shorter upstream frustum 202, such that the length 208 is greater than the length 188. Additionally, as shown in FIGS. 6A and 6B, the diameter D of the conduits 158 and 197 of each of the family of differential pressure meters may be identical.

Additional differential pressure meters having permanently coupled fluid displacement members may use the techniques described above to maintain a beta edge boundary and enable reuse of calibration information across different meters. For example, as noted in FIG. 6B, if the size of the upstream frustum is decreased, the length 208 of the barrel 200 may be increased to maintain the position of the beta edge boundary 154 relative to the center lines 164 and 168 of the taps 162 and 166 respectively. Similarly, if the size of the upstream frustum is increased, the length 208 of the barrel 200 may be decreased to maintain the position of the beta edge boundary 154. Thus, all such meters in the family of differential pressure meters described above may have a constant beta edge boundary.

In other embodiments, the beta edge boundary may be maintained in the same position across a family of differential pressure meters with permanent fluid displacement members disposed in a meter body having wall taps, i.e., without a central tap. FIGS. 7A-7B depict a wall tap differential pressure meter 210 having a permanently coupled fluid displacement member 212 defining a beta edge boundary 214 in accordance with an embodiment of the present invention. The differential pressure meter 210 includes a meter body 216 having a conduit 218 through which fluid may flow. The meter body 216 also includes an upstream wall tap 220 having a center line 221 and a downstream wall tap 222 having a center line 223 disposed in meter body 216 and in fluid communication with the conduit 218. The fluid displacement member 212 may be centrally disposed in the conduit 218 and suspended from the conduit 218 via a support 224. The support 224 may be permanently coupled to the wall of the conduit 218, such as by welding, and the fluid displacement member 212 may be permanently coupled to the support 224, such as by welding. In some embodiments, the fluid displacement member 212 and support 224 may be a single component.

As described above, in some embodiments the fluid displacement member 212 may include an upstream frustum 226 and a downstream frustum 228 that form a peripheral edge 230 that defines the beta edge boundary 214. The fluid displacement member 212 may define a beta ratio $\beta_1$ based on the diameter $d_1$ of the peripheral edge 230 and the diameter D of the conduit 218.

As described above, the beta edge boundary 214 may be defined relative to the center line 221 by a distance 234 and relative to the center line 223 by a distance 236. Additionally, the fluid displacement member 212 may be coupled to the support 224 by a barrel 238 having a length 240 and defined relative to the center line 221 by a distance 242.

As discussed above, by maintaining the position of the beta edge boundary 214, the additional meters, such as shown in FIG. 7B, may have a similar C.d., and thus may use the same calibration information, as the meter 210 depicted in FIG. 7A. For example, as shown in FIG. 7B, a second meter 244 may include a fluid displacement member 246 permanently coupled to a meter body 248 having a conduit 250 and having the same position of the beta edge boundary 214 relative to the wall taps 220 and 222.

The fluid displacement member 246 of the second meter 244 may be permanently coupled to the meter body 248 by a support 252 and a barrel 254 having a length 255 in a manner similar to the meter 210. Additionally, the fluid displacement member 246 may also include an upstream frustum 256 and a downstream frustum 258 forming a peripheral edge 260 at the beta edge boundary 214.

As shown in FIG. 7B, the meter 244 may have a different beta ratio $\beta_2$, based on the diameter D of the conduit 250 and the diameter $d_2$ of the peripheral edge 260 of the member 246. However, as also shown in FIG. 7B, the position of the beta edge boundary 214 is maintained relative to the center line 221 of the tap 220 and the center line 223 of the downstream tap 222. Thus, the meter 244 may have the same C.d. as the meter 210, allowing the meter 244 to use the same calibration information as the meter 210. In some embodiments, the beta edge boundary 214 may be maintained by increasing the length 255 of the barrel 254, to adjust for a shorter upstream frustum 256, such that the length 255 is greater than the length 240. In other embodiments, the beta edge boundary 214 may be maintained by adjusting the position of the support 252 on the wall of the meter body 248, such as by moving the support 252 further downstream to maintain the position of the beta edge boundary 214.

Additional differential pressure meters having permanently coupled fluid displacement members may use the techniques described above to maintain a beta edge boundary and enable reuse of calibration information across different meters. For example, as noted in FIG. 7B, if the size of the upstream frustum is decreased, the length 255 of the barrel 254 may be increased to maintain the position of the beta edge boundary 214 relative to the center lines 221 and 223 of the wall taps 220 and 222 respectively. Additionally, or alternatively, the position of the support 252 may be adjusted, such as by moving the support 252 further downstream to maintain the position of the beta edge boundary 214. Similarly, if the size of the upstream frustum 256 is increased, the length 255 of the barrel 254 may be decreased to maintain the position of the beta edge boundary 214. Additionally, or alternatively, the support 252 may be moved further upstream to maintain the position of the beta edge boundary 214. Thus, all such meters in the family of differential pressure meters described above may have a constant beta edge boundary.

Figure 8:
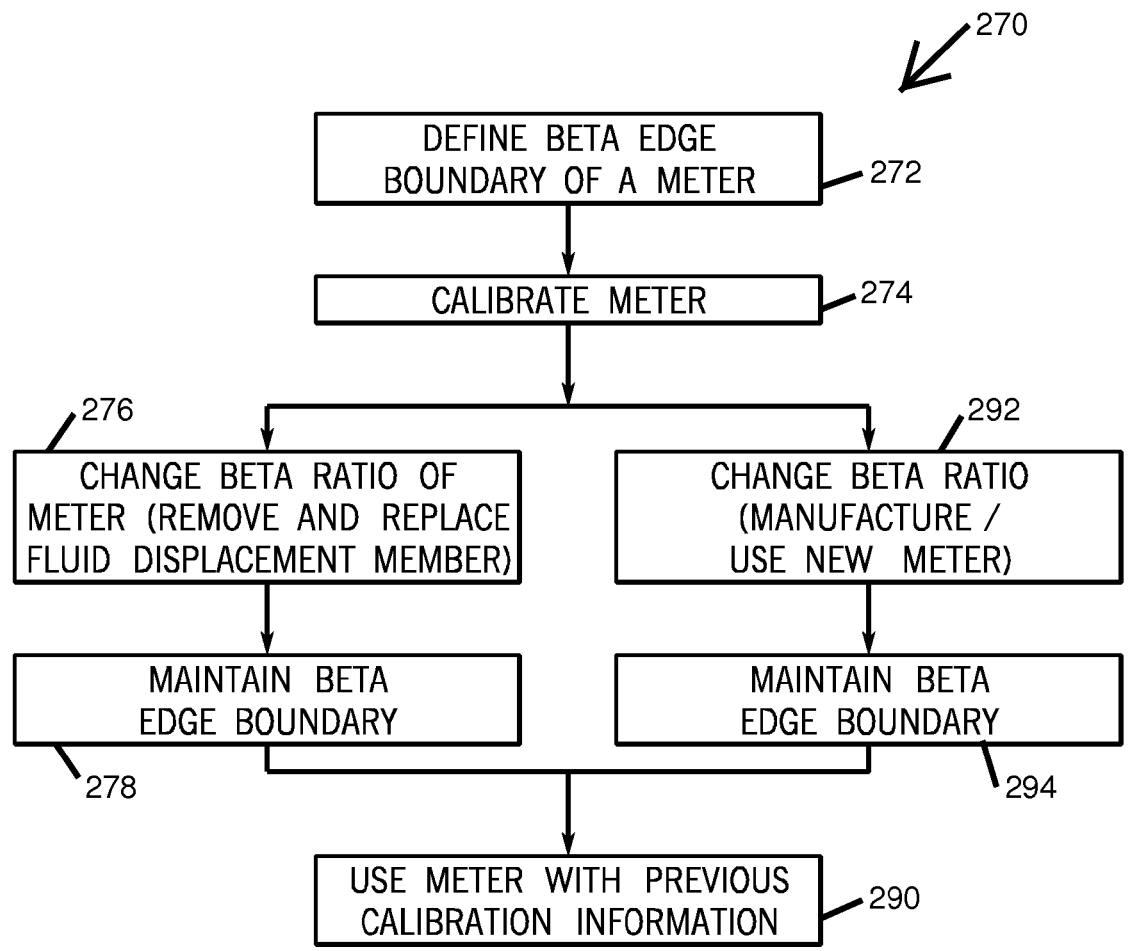
FIG. 8 is a flowchart of a process for operation of a differential pressure meter in accordance with an embodiment of the present invention.

FIG. 8 is a flowchart 270 depicting use of differential pressure meters according to the techniques described above. Initially, a beta edge boundary for a differential pressure meter having a first beta ratio may be determined (block 272), such as shown above in FIG. 2. The meter may be calibrated based on the C.d. for that meter (block 274). In some embodiments, as shown above in FIGS. 3A-3C, the beta ratio of the meter may be changed by replacing the fluid displacement member of the meter (block 276). As also shown above in FIGS. 3A-3C, the replaced fluid displacement member may maintain the position of the beta edge boundary of the meter (block 278). The meter may then be used with previously determined calibration information (block 290).

In other embodiments, as shown above in FIGS. 6A-6B and FIGS. 7A-7B, the beta ratio of may be changed by manufacturing and/or using another meter in a family of differential pressure meters, having, for example, a permanently coupled fluid displacement member (block 292). As also shown above in FIGS. 6A-6B and FIGS. 7A-7B, the position of the beta edge boundary may constant (block 294), such as by changing the length of the barrel of a fluid displacement member or moving the support of a fluid displacement member. The new meter may then be used with previously determined calibration information (block 290).

Figure 9A:
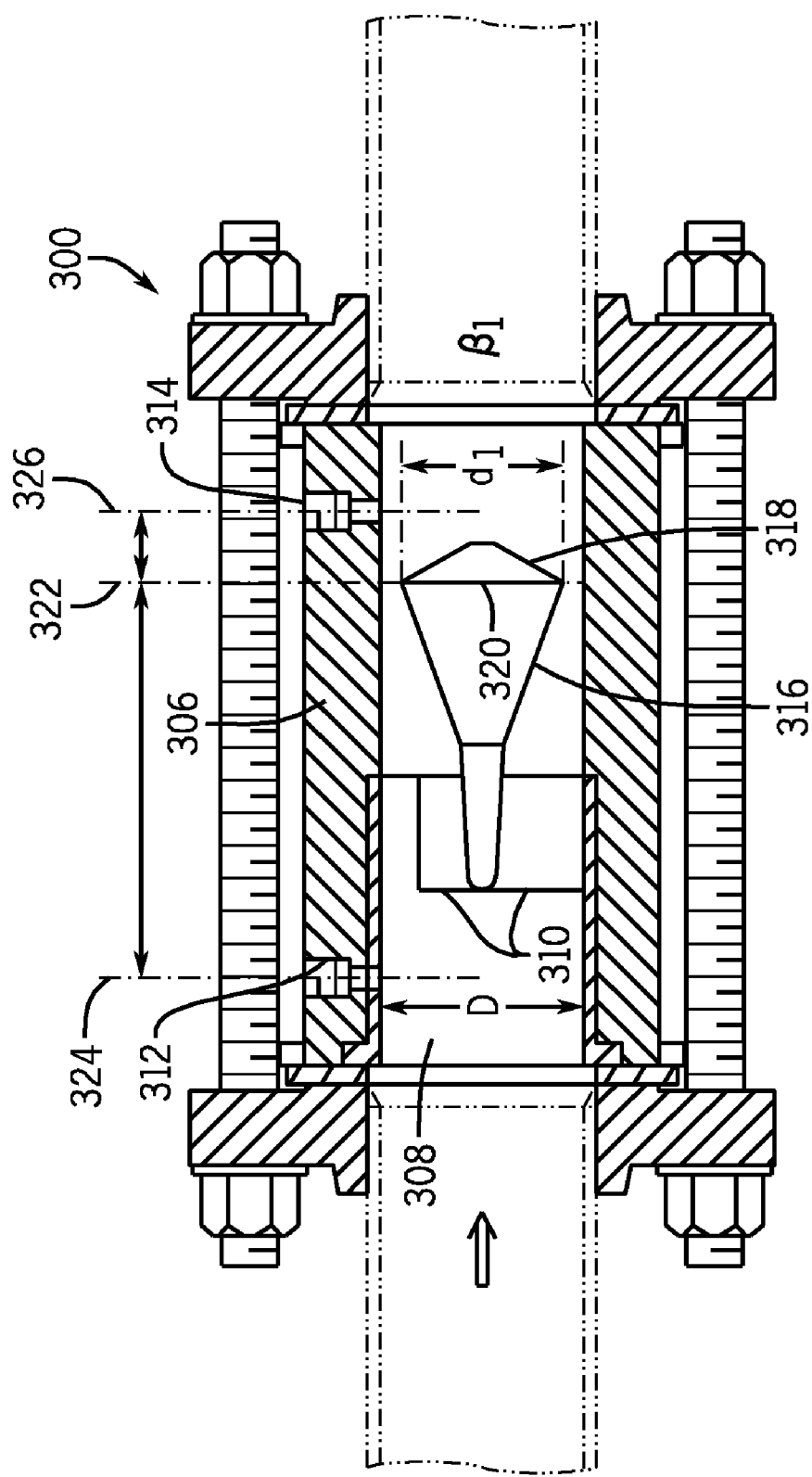
FIGS. 9A and 9B are partial cross-sections of a flangeless differential flow meter having an interchangeable fluid displacement member in accordance with an embodiment of the present invention.
Figure 9B:
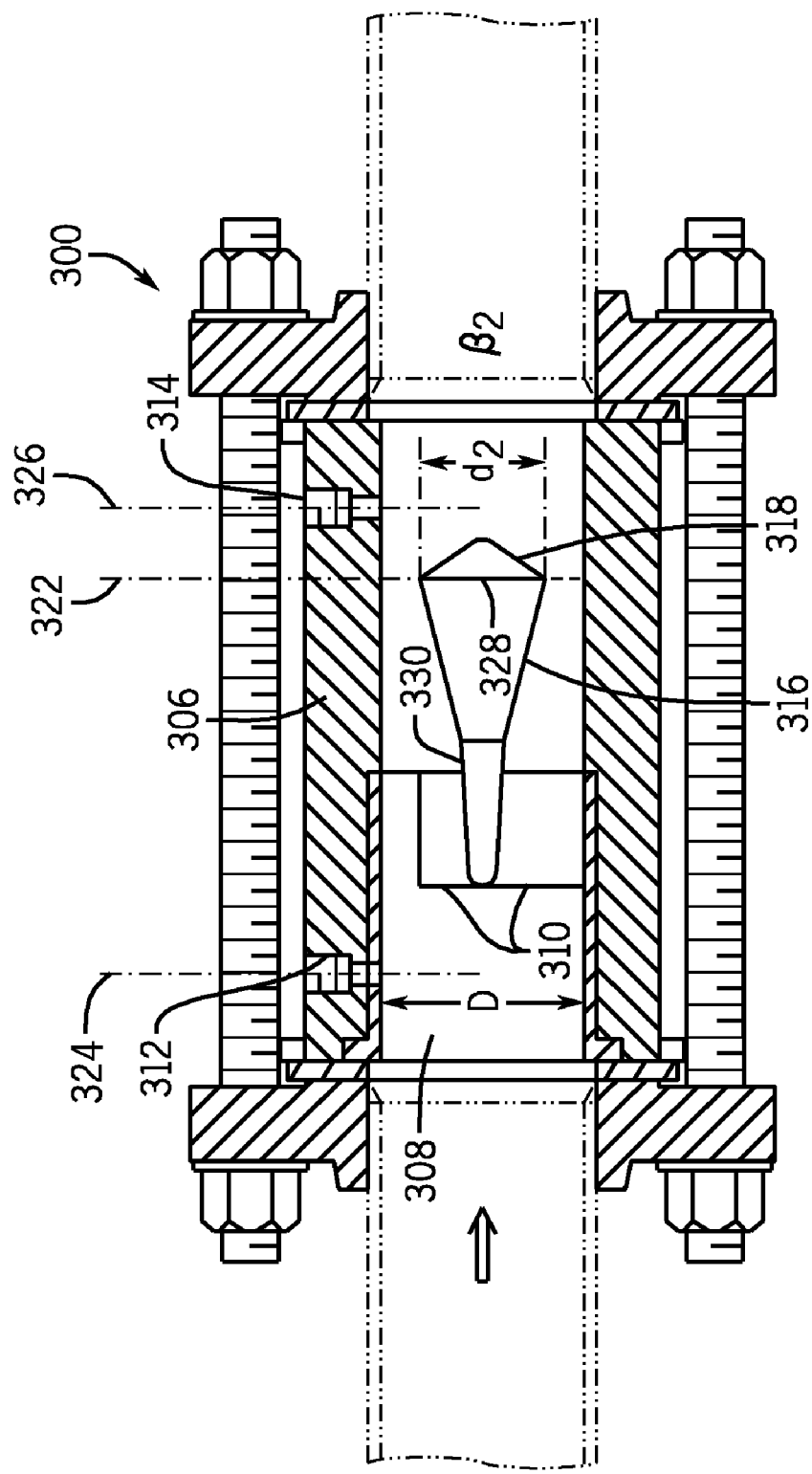

In other embodiments, the beta edge boundary may be maintained for interchangeable fluid displacement members of other types of differential pressure flow meters, such as a "flangless" differential pressure meter. FIGS. 9A and 9B depict a flangless differential pressure flow meter 300 having removable fluid displacement members 302 and 304 in accordance with an embodiment of the present invention. The differential pressure meter 300 includes a flangless meter body 306 having a conduit 308 through which fluid may flow. As shown in FIG. 9A, the fluid displacement member 300 may be centrally disposed in the conduit 308 and suspended from the conduit 308 via one or more supports 310. The meter body 306 may include an upstream pressure tap 312 and downstream pressure tap 314 in fluid communication with the conduit 308.

The fluid displacement member 302 may include an upstream frustum 316 and a downstream frustum 318 that function in the manner described above in FIGS. 3A-C. As described above, the interface between these frustums 316 and 318 may form a peripheral edge 320 that defines a beta edge boundary 322. The meter 300 and fluid displacement member 302 may define a beta ration B1 based on the diameter d1 of the peripheral edge 320 and the diameter D of the conduit. As described above, the beta edge boundary 322 may be defined relative to a center line 324 of the upstream tap and relative to a center line 326 of the downstream tap 314.

The fluid displacement member 302 may be interchangeable and may be detached from the supports 310 and replaced with the additional fluid displacement member 304, as shown in FIG. 9B, The fluid displacement member 310 may be coupled to the supports 310, as shown below in FIG. 10.

As shown in FIG. 9B, the additional fluid displacement member 304 may provide a different beta ratio $\beta_2$, such as through a larger or smaller diameter $d_2$ of a peripheral edge 328 of the member 304. As shown in FIGS. 9A and 9B, the additional fluid displacement member 304 maintains a constant position of the beta edge boundary 322 relative to the center lines 324 and 326. For example, as shown in FIG. 9B, the length of a section 330 of the fluid displacement member 304 may be extended to maintain the position of the beta edge boundary 322. In other embodiments, the length of a barrel section of a fluid displacement may be reduced to maintain the position of the beta edge boundary 322.

Advantageously, the meter 300 depicted in FIGS. 9A and 9B may maintain a similar C.d. regardless of the use of fluid displacement members 302 and 304, or other fluid displacement members that maintain the same beta edge boundary. Thus, the meter 300 may only require a single calibration and use of the same calibration information, e.g., C.d., regardless of the beta ratio $\beta_1$, $\beta_2$, etc.

FIG. 10 is a perspective view of the flangless meter body 306 and the fluid displacement member 302 in accordance with an embodiment of the present invention. As shown in FIG. 10, the fluid displacement member 302 may be coupled to an annular insert 334 having one or more of the supports 310 extending radially from an inner wall of the insert 334. The supports 310 may be coupled to a receptacle 336 that receives the fluid displacement member 302. For example, the fluid displacement member 302 may be coupled to the receptacle 336 via threads or any other suitable coupling mechanism.

The annular insert 334 may be coupled to the meter body 306 via fasteners 338, e.g., bolts, screws, or other suitable fasteners. The fasteners 338 may be inserted into holes 340 of the annular insert 334 and into holes 342 of the meter body 306. The annular insert 334 may be received by a recess 344 of the meter body 306. In this manner, the annular insert 334 may provide for the removal and installation of different fluid displacement members that maintain the same beta edge boundary, as described above. In some embodiments, the entire insert 334 may be removed and replaced. In other embodiments, only the fluid displacement member 302 is removed from the meter 300 and replaced. For example, the fluid displacement member 302 may be removed from the insert 334 and the fluid displacement member 304 may be installed in the insert 334. Additionally, o-rings or other seals may be disposed on either end of the meter body 306, such as on the insert 334.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method, comprising:
    calibrating a differential pressure meter having a first fluid displacement member and a first beta ratio to produce a set of calibration data;
    installing a second fluid displacement member having a second beta ratio;
    operating the differential pressure meter having the second fluid displacement member using the set of calibration data determined with the first fluid displacement member and the first beta ratio.

2. The method of claim 1, comprising removing the first fluid displacement member via disengagement of one or more threaded couplings.

3. The method of claim 1, comprising installing a third fluid displacement member having a third beta ratio.

4. The method of claim 3, comprising operating the differential pressure meter having the third fluid displacement member using the set of calibration data determined with the first fluid displacement member and the first beta ratio.

5. The method of claim 1, wherein a position of a beta edge boundary for each of the first and second fluid displacement members is constant.

6. The method of claim 5, wherein each of the first and second fluid displacement members comprises a first frustum and a second frustum.

7. The method of claim 6, wherein each of the first and second fluid displacement members comprises a peripheral edge at an interface between the first frustum and the second frustum, wherein the peripheral edge is aligned with the beta edge boundary.

8. The method of claim 5, wherein the differential pressure meter comprises a first tap and second tap.

9. The method of claim 8, wherein the position of the beta edge boundary is constant relative to the first tap or the second tap.

10. The method of claim 5, wherein the differential pressure meter comprises a support, and each of the first and second fluid displacement members is configured to selectively couple to the differential pressure meter by the support.

11. The method of claim 10, wherein each of the first and second fluid displacement members is configured to selectively couple to the support by a respective barrel.

12. A non-transitory tangible medium, comprising instructions for:
calibrating a differential pressure meter having a first fluid displacement member and a first beta ratio to produce a set of calibration data;
installing a second fluid displacement member having a second beta ratio; and
operating the differential pressure meter having the second fluid displacement member using the set of calibration data determined with the first fluid displacement member and the first beta ratio.

13. The medium of claim 12, comprising instructions for removing the first fluid displacement member via disengagement of one or more threaded couplings.

14. The medium of claim 12, comprising instructions for installing a third fluid displacement member having a third beta ratio.

15. The medium of claim 14, comprising instructions for operating the differential pressure meter having the third fluid displacement member using the set of calibration data determined with the first fluid displacement member and the first beta ratio.

16. The medium of claim 12, wherein a position of a beta edge boundary for each of the first and second fluid displacement members is constant.

17. The medium of claim 16, wherein each of the first and second fluid displacement members comprises a first frustum and a second frustum.

18. The medium of claim 17, wherein each of the first and second fluid displacement members comprises a peripheral edge at an interface between the first frustum and the second frustum, wherein the peripheral edge is aligned with the beta edge boundary.

19. The medium of claim 16, wherein the differential pressure meter comprises a first tap and second tap.

20. The medium of claim 19, wherein the position of the beta edge boundary is constant relative to the first tap or the second tap.

21. The medium of claim 16, wherein the differential pressure meter comprises a support, and each of the first and second fluid displacement members is configured to selectively couple to the differential pressure meter by the support.

22. The medium of claim 21, wherein each of the first and second fluid displacement members is configured to selectively couple to the support by a respective barrel.

* * * * *